United States Patent [19]

Krieg

[11] 4,094,612

[45] June 13, 1978

[54] TOOL MOUNTING APPARATUS

[75] Inventor: Adrian H. Krieg, Yorktown Heights, N.Y.

[73] Assignee: Widder Corporation, Mamaroneck, N.Y.

[21] Appl. No.: 709,890

[22] Filed: Jul. 29, 1976

[51] Int. Cl.[2] .................... B23B 39/00; B23B 47/00; B23B 49/00

[52] U.S. Cl. .................................... 408/92; 29/559; 248/231

[58] Field of Search .................. 29/526, 559; 248/214, 248/231; 408/76, 197, 238, 104, 105, 92

[56] References Cited

U.S. PATENT DOCUMENTS

| | | | |
|---|---|---|---|
| 436,609 | 9/1890 | Mueller | 408/92 |
| 1,113,781 | 10/1914 | Griffin | 248/231 X |
| 2,932,194 | 4/1960 | Buck | 408/76 |
| 3,241,800 | 3/1966 | Richter | 248/231 X |
| 3,922,107 | 11/1975 | Fowler | 408/92 X |

*Primary Examiner*—Charlie T. Moon
*Attorney, Agent, or Firm*—Bierman & Bierman

[57] ABSTRACT

A plate having a flat surface for mounting the tool to an irregular or curved work piece is provided. The plate has a plurality of depending legs forming a notch between them for straddling the work piece. Means for fastening the plate to the work piece are also provided.

7 Claims, 2 Drawing Figures

TOOL MOUNTING APPARATUS

The present invention relates to an apparatus for mounting an object on work pieces having curved or irregular surfaces, pipes in particular.

In accordance with the present invention, the mounting apparatus comprises a plate, preferably ferromagnetic, having a flat surface on which the tool is placed. The plate is provided with a plurality of depending legs forming a notch between them for straddling the work piece. Fastening means are mounted on the underside of the plate and girdle the work piece.

For best results, the notch is made V-shaped to permit the plate to straddle different sized work pieces. The fastening means is mounted to the underside of the plate, girdles the work piece to securely mount it to the plate, and is adjustable to accomodate different size work pieces.

In a preferred construction, the fastening means comprises a fastener, preferably a chain, along with means for securing the fastener to the underside of the plate. At least one of the means for securing the fastener comprises a hook assembly pivotably mounted on said plate to aid in securely mounting the plate to the curved work piece.

Referring now to the drawings, in which like numerals refer to like parts:

Figure 1:
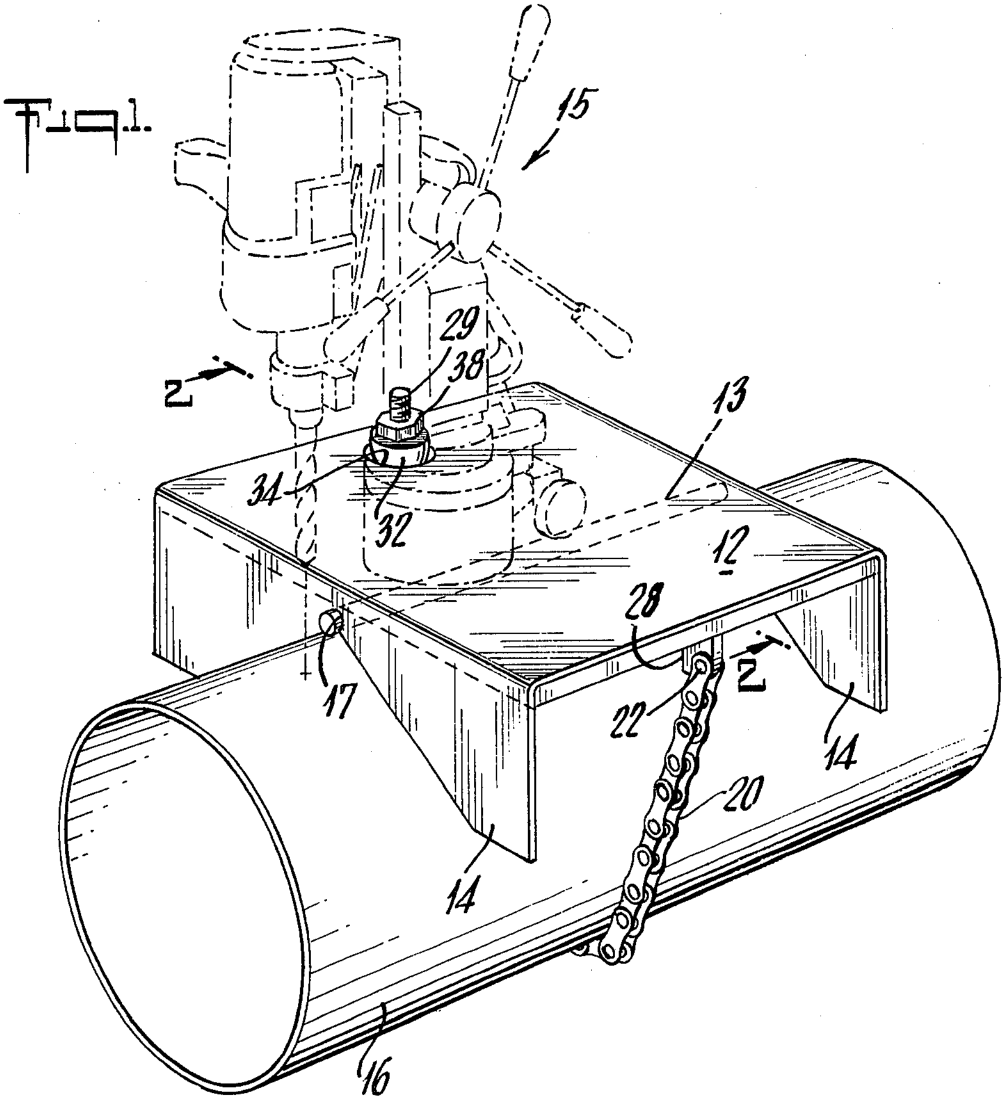
FIG. 1 is an isometric view of one embodiment of this invention.
Figure 2:
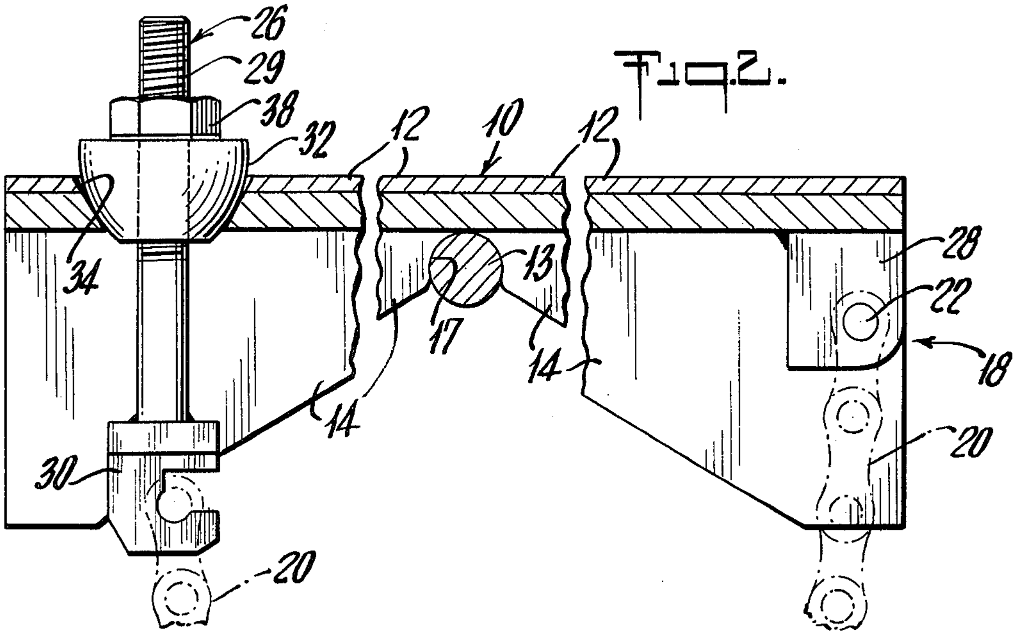
FIG. 2 is a detailed view of the second hook means showing the hook and stem; taken along line 2—2 in FIG. 1.

In FIG. 1, the numeral 10 denotes a plate having four depending legs 14 straddling a curved work piece 16. The curved work piece chosen for purposes of illustration is a conventional pipe. The flat surface 12 of plate 10 is preferably made of a ferromagnetic material and can carry any type of tool or other object. The plate is shown here in carrying a magnetic base drill 15 in position to address the work piece 16.

The plate 10 is portable from one work piece to another and adapts well to portable tools having a flat, heavy mounting base.

Legs 14, in pairs, are shown straddling the surface of a cylindrical pipe 16. The magnetic plate 10 is held in place on the pipe 16 by a fastening means which comprises a chain 20 which girdles the underside of the pipe. The chain 20, which is depicted as a conventional roller chain, is attached to one end of the magnetic plate 10 by a first hook means 18 and to the opposed end by a second hook means 26. Although a roller chain is shown, any chain capable of connecting to two spaced points can be used.

The first hook means comprises a depending plate 28 firmly secured to the underside of the plate by conventional means, such as welding. The chain 20 is connected to the plate 28 by a conventional fastening means such as a rivet 22 or a nut and bolt assembly.

The second hook means 26 comprises a stem 29, one end of which has a hook 30 thereon. The stem is carried in a bushing 32 which mounts in a tapered hole 34 in plate 10.

For best results hole 34 is provided with straight, tapered sides forming a frusto conical hole. The bushing 32 has an external shape which is substantially frusto conical, but the sides of the bushing are somewhat curved, as shown, to permit pivoting or swivelling movement of the bushing in the hole 34.

Stem 28 has screw threads 36 cut at its upper end which accepts a conventional nut 38. When the stem is placed in bushing 32 with the screw threads 36 exposed as shown in FIG. 1, the nut 38 is turned down to lock the stem in place in the bushing.

The use of the invention will now be described with regard to a pipe to be addressed by a flat base drill. As shown in FIG. 1, the plate 10 is mounted so that legs 14 straddle pipe 16. The use of a V-notch permits mounting of the plate on various size pipes, gives fore and aft stability, and the edges of the notch provide a sharp gripping surface, insuring a tight clamping action.

Chain 20, first secured to plate 28, is then tightly wrapped around the pipe 16 and the chain link closest to hook 30 is then engaged by the hook. The angle of the stem with respect to the plate surface will change based on the size of the pipe 16 to aid in securely locating the pipe in the notch. It will be appreciated that the angle of the chain with respect to the pipe will vary with the diameter of the pipe, the pivotable stem tending to insure that the angle the chain makes with respect to each side of the pipe is about the same. Further adjustment can be made, if desired, by pulling the stem 28 upwardly through the bushing 32 and then tightening the nut 38.

As shown in FIG. 1, a rod 13 is mounted in an elongated bore 17 to align with the fore-aft axis of the plate 10. Rod 13, when pulled out, serves as a centering guide for the tool, such as a drill bit, thus insuring the correct positioning of the drill on the plate and the correct address of the tool to the work piece.

Many modifications into the above-described embodiment will occur to those of ordinary skill in the art. It is intended to cover all such modifications which do not depart from the spirit and scope of this invention as defined in the claims appended hereto.

I claim:

1. Apparatus for supporting a tool relative to a work piece having a curved or irregular circumferential surface, comprising a flat mounting plate having a pair of side legs respectively depending from first and second opposite sides of said plate, each of said side legs having a substantially identical V-shaped notch adapted to receive said work piece, the apex of each notch being adjacent to and positioned substantially at the center of the mounting plate, and means attaching said plate to said work piece comprising a flexible fastener, first means attaching one end of said fastener to a third side of said plate and second means depending from a fourth side of said plate and adapted to engage the other end of said fastener, said second means including an adjustable device for pulling the said other end of said fastener toward the bottom of said plate to engage the edges of the notches into tight gripping relationship with the surface of said work piece.

2. Apparatus according to claim 1, in which said second means comprises a hook engaging said flexible fastener and having a threaded stem extending through an opening in said plate, and a nut on the outer section of said stem, whereby tightening said nut pulls the fastener toward the plate and urges the fastener into gripping relationship with the work piece.

3. Apparatus according to claim 2, in which the opening in said plate is larger than the stem of said hook, a bushing in said opening through which said stem passes and means mounting said bushing in said opening with swiveling movement, whereby said fastener and said hook adjust themselves to the shape and diameter of said work piece.

4. Apparatus according to claim 1, in which the apex of each V-shaped notch is provided with lateral openings on each side of the V, whereby such openings form a bore on the underside of said plate, and a centering guide slidably mounted in said bore, whereby said guide acts as a centering device for the plate and the tool supported thereon.

5. Apparatus according to claim 1, in which the supporting surface of said mounting plate is formed of magnetic material.

6. Apparatus for dismountably supporting a drill having a magnetic base in operative relationship to a pipe to be drilled, comprising a flat tool-supporting plate of magnetic material, a pair of side legs respectively depending from first and second opposite sides of said plate, each of said legs having a substantially identical V-shaped notch adapted to receive said pipe, the apex of each notch being adjacent to and positioned substantially at the center of the supporting plate, and means attaching said plate to said pipe comprising a flexible fastener, first means attaching one end of said fastener to a third side of said plate, second means depending from a fourth side of said plate and adapted to engage the other end of said fastener, said second means including an adjustable device for pulling the said other end of said fastener toward the bottom of said plate to engage the edges of the notches into tight gripping relationship with the surface of said pipe.

7. Apparatus according to claim 6, in which the apex of each V-shaped notch is provided with lateral openings on each side of the V, whereby said openings form a bore on the underside of said plate, and a centering guide slidably mounted in said bore, whereby said guide acts as a centering device for the plate and the drill supported thereon.

* * * * *